US011251435B2

(12) United States Patent
Shibano et al.

(10) Patent No.: US 11,251,435 B2
(45) Date of Patent: Feb. 15, 2022

(54) UNDERCOAT FOIL FOR ENERGY STORAGE DEVICE ELECTRODE

(71) Applicant: NISSAN CHEMICAL INDUSTRIES, LTD., Tokyo (JP)

(72) Inventors: Yuki Shibano, Funabashi (JP); Tatsuya Hatanaka, Funabashi (JP); Takuji Yoshimoto, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 17 days.

(21) Appl. No.: 15/542,600

(22) PCT Filed: May 26, 2016

(86) PCT No.: PCT/JP2016/065529
§ 371 (c)(1),
(2) Date: Jul. 10, 2017

(87) PCT Pub. No.: WO2016/194747
PCT Pub. Date: Dec. 8, 2016

(65) Prior Publication Data

US 2018/0269488 A1 Sep. 20, 2018

(30) Foreign Application Priority Data

Jun. 4, 2015 (JP) ............................ JP2015-113956
Nov. 20, 2015 (JP) ............................ JP2015-227790

(51) Int. Cl.

| | |
|---|---|
| ***H01M 4/66*** | (2006.01) |
| ***H01G 11/68*** | (2013.01) |
| ***H01G 11/28*** | (2013.01) |
| ***H01G 11/36*** | (2013.01) |
| ***H01G 11/70*** | (2013.01) |
| ***H01G 11/74*** | (2013.01) |
| ***H01M 10/058*** | (2010.01) |
| ***H01M 4/13*** | (2010.01) |
| ***H01M 50/531*** | (2021.01) |
| ***H01G 11/48*** | (2013.01) |
| ***H01G 11/86*** | (2013.01) |
| ***H01M 4/131*** | (2010.01) |
| ***H01M 10/0525*** | (2010.01) |
| *H01G 11/38* | (2013.01) |
| *H01G 11/84* | (2013.01) |
| *H01G 11/50* | (2013.01) |
| *B82Y 30/00* | (2011.01) |

(52) U.S. Cl.
CPC ............ *H01M 4/667* (2013.01); *H01G 11/28* (2013.01); *H01G 11/36* (2013.01); *H01G 11/48* (2013.01); *H01G 11/68* (2013.01); *H01G 11/70* (2013.01); *H01G 11/74* (2013.01); *H01G 11/86* (2013.01); *H01M 4/13* (2013.01); *H01M 4/131* (2013.01); *H01M 4/66* (2013.01); *H01M 4/661* (2013.01); *H01M 4/666* (2013.01); *H01M 10/058* (2013.01); *H01M 10/0525* (2013.01); *H01M 50/531* (2021.01); *B82Y 30/00* (2013.01); *H01G 11/38* (2013.01); *H01G 11/50* (2013.01); *H01G 11/84* (2013.01); *Y02E 60/13* (2013.01); *Y10S 977/742* (2013.01); *Y10S 977/753* (2013.01); *Y10S 977/948* (2013.01)

(58) Field of Classification Search
CPC ........ H01G 11/28; H01G 11/48; H01G 11/38; H01G 11/50; H01G 11/68; H01G 11/70; H01G 11/74; H01G 11/84; H01G 11/86; H01G 11/36; H01M 2/26; H01M 4/13; H01M 4/66; H01M 10/04; H01M 10/058; H01M 4/667; H01M 4/666; H01M 4/661; H01M 4/131; H01M 10/0525; H01M 50/531; Y02E 60/13; Y10S 977/948; Y10S 977/753; Y10S 977/742; B82Y 30/00
USPC .......................................................... 429/211
See application file for complete search history.

(56) References Cited

U.S. PATENT DOCUMENTS 5,571,950 A * 11/1996 Waddoups ......... G01N 33/2888 73/53.05
8,993,162 B2 3/2015 Sakamoto
(Continued)

FOREIGN PATENT DOCUMENTS

JP 2010-163570 A 7/2010
JP 2010-170965 A 8/2010
(Continued)

OTHER PUBLICATIONS

English language machine translation of : "Agent for Dispersing Electrically Conductive Carbon Material, and Dispersion of Electrically Conductive Carbon Material by Hatanaka Tatsuya et al. in WO2015029949 (A1)—Mar. 5, 2015" (Year: 2015).*
(Continued)

*Primary Examiner* — Jonathan G Jelsma
*Assistant Examiner* — Omar M Kekia
(74) *Attorney, Agent, or Firm* — Birch, Stewart, Kolasch & Birch, LLP

(57) ABSTRACT

This undercoat foil for an energy storage device electrode comprises a collector base plate, and an undercoat layer formed on at least one surface of the collector base plate, the undercoat layer containing carbon nanotubes, and the coating amount per collector base plate surface being 0.1 $g/m^2$ or less. Since this undercoat foil can be effectively welded by ultrasound, the use thereof allows a low-resistance energy storage device and a simple and effective production method therefor to be provided.

15 Claims, No Drawings

(56) References Cited

U.S. PATENT DOCUMENTS

| | | | | |
|---|---|---|---|---|
| 2012/0268840 | A1* | 10/2012 | Hida | B01F 17/005 359/885 |
| 2013/0045413 | A1* | 2/2013 | Wang | H01M 4/13 429/163 |
| 2015/0037535 | A1* | 2/2015 | Akimoto | C09C 1/3072 428/141 |
| 2015/0093649 | A1 | 4/2015 | Arai et al. | |
| 2015/0213967 | A1* | 7/2015 | Yokouchi | H01M 4/661 429/211 |
| 2015/0228982 | A1 | 8/2015 | Shibano et al. | |
| 2016/0200850 | A1 | 7/2016 | Hatanaka et al. | |
| 2016/0332641 | A1 | 11/2016 | Saito et al. | |

FOREIGN PATENT DOCUMENTS

| | | | |
|---|---|---|---|
| TW | 201310761 | A1 | 3/2013 |
| WO | WO 2013/153916 | A1 | 10/2013 |
| WO | WO 2014/034113 | A1 | 3/2014 |
| WO | WO 2014/042080 | A1 | 3/2014 |
| WO | WO 2014/077366 | A1 | 5/2014 |
| WO | WO 2015/029949 | A1 | 3/2015 |

OTHER PUBLICATIONS

Taiwanese Office Action issued in the corresponding Taiwanese Patent Application No. 107144196 dated Nov. 5, 2019.

* cited by examiner

UNDERCOAT FOIL FOR ENERGY STORAGE DEVICE ELECTRODE

TECHNICAL FIELD

The present invention relates to an undercoat foil for an energy storage device electrode.

BACKGROUND ART

There has been a desire in recent years for higher capacity and more rapid charging and discharging in energy storage devices such as lithium-ion secondary batteries and electrical double-layer capacitors in order to handle applications such as electric vehicles and electrically powered equipment.

One way to address this desire has been to place an undercoat layer between the active material layer and the current-collecting substrate, thereby strengthening adhesion between the active material layer and the current-collecting substrate and also lowering the resistance at the contact interface therebetween (see, for example, Patent Document 1).

Generally, in an energy storage device, metal tabs are separately welded to the positive electrode and the negative electrode as terminals for extracting current from the positive and negative electrodes.

The metal tabs are typically welded to the current-collecting substrates. Even in an electrode where an undercoat layer has been formed, welding of the metal tab is carried out at a region on the current-collecting substrate where the undercoat layer and the active material layer have not been formed (see, for example, Patent Document 1).

Methods of forming a metal tab welding region on a current-collecting substrate having an undercoat layer formed thereon include the method of not forming the undercoat layer and the active material layer at the metal tab welding region on the current-collecting substrate, and the method of peeling off a portion of the undercoat layer and the active material layer formed on the current-collecting substrate.

However, current-collecting substrates in which part of the undercoat layer is not formed have a lower versatility, creating a need to furnish current-collecting substrates that differ for each type of electrode. On the other hand, the method of peeling off the undercoat layer, etc. once it has been formed represents an additional step, which lowers the device productivity.

In particular, when a plurality of electrode plates are stacked in order to increase the device capacity, the problems associated with forming a region where, as noted above, the current-collecting substrate is exposed become even larger.

From this standpoint, in one technique for welding a metal tab to a current-collecting substrate that has been reported, welding is carried out at a region on the current-collecting substrate where an undercoat layer has been formed and an active material layer has not been formed (see, for example, Patent Document 2).

In this prior-art publication, the coating weight of the undercoat layer on one side of the current-collecting substrate is set to from 0.05 to 3 g/m$^2$.

However, with the continued growth in demand lately for safety and productivity in products such as electric vehicles and electrically powered equipment, efforts are being made to achieve further progress in the art relating to electrical energy storage devices.

In particular, processes capable of manufacturing electrical energy storage devices having a higher productivity and a higher safety are strongly desired in this field because such processes can contribute directly to product manufacturing that satisfies the needs of the market in recent years for low cost and high safety.

However, the inventors have determined from investigations that, depending on the type of carbon material, ultrasonic welding having a good reproducibility is sometimes impossible using the manufacturing method of Patent Document 2, even in cases where those conditions are satisfied.

PRIOR ART DOCUMENTS

Patent Documents

Patent Document 1: JP-A 2010-170965

Patent Document 2: WO 2014/034113

SUMMARY OF THE INVENTION

Problems to be Solved by the Invention

The present invention was arrived at in light of the above circumstances. An object of this invention is to provide an undercoat foil for use in an energy storage device electrode that can be ultrasonically welded and enables a low-resistance energy storage device to be achieved. Further objects are to provide an energy storage device electrode and an energy storage device which have such an undercoat foil.

Means for Solving the Problems

The inventors have conducted extensive investigations on the weldability of undercoat layers and on lowering the resistance of devices having an undercoat layer. As a result, they have discovered that, by using carbon nanotubes (abbreviated below as "CNTs") as the carbon material included in an undercoat layer formed on at least one side of a current-collecting substrate and setting the coating weight of the CNT-containing undercoat layer in a specific range, ultrasonic welding can be efficiently carried out on a region of the current-collecting substrate where a CNT-containing undercoat layer has been formed. It was also found that, even when an electrode having an undercoat foil at this low coating weight is used, a low-resistance energy storage device can be obtained. These discoveries ultimately led to the present invention.

Accordingly, the invention provides:

1. An undercoat foil for an energy storage device electrode, comprising a current-collecting substrate and an undercoat layer formed on at least one side of the current-collecting substrate, wherein the undercoat layer includes carbon nanotubes and has a coating weight per side of the current-collecting substrate of not more than 0.1 g/m$^2$;

2. The undercoat foil for an energy storage device electrode of 1 above, wherein the undercoat layer is formed on at least one side of the current-collecting substrate in such a way as to cover the entire surface thereof;

3. The undercoat foil for an energy storage device electrode of 1 or 2 above, wherein the undercoat layer includes a matrix polymer;

4. The undercoat foil for an energy storage device electrode of any one of 1 to 3 above, wherein the undercoat layer includes a carbon nanotube dispersant;

5. The undercoat foil for an energy storage device electrode of 4 above, wherein the carbon nanotube dispersant is a triarylamine-based highly branched polymer or a pendant oxazoline group-containing vinyl polymer;

6. The undercoat foil for an energy storage device electrode of any one of 1 to 5 above, wherein the coating weight is less than 0.05 $g/m^2$;

7. The undercoat foil for an energy storage device electrode of any one of 1 to 6 above, wherein the undercoat layer has a thickness of from 0.01 to 10 μm;

8. The undercoat foil for an energy storage device electrode of any one of 1 to 7 above, wherein the current-collecting substrate is aluminum foil or copper foil;

9. An energy storage device electrode comprising the undercoat foil for an energy storage device electrode of any one of 1 to 8 above and an active material layer formed over part or all of a surface of the undercoat layer;

10. The energy storage device electrode of 9 above, wherein the active material layer is formed over part of the undercoat layer surface;

11. The energy storage device electrode of 10 above, wherein the active material layer is formed in such a way as to cover all regions of the undercoat layer other than a peripheral edge thereof;

12. An energy storage device comprising the energy storage device electrode of any one of 9 to 11 above;

13. An energy storage device comprising at least one electrode assembly comprised of one or a plurality of the electrodes of 10 or 11 above and a metal tab, wherein at least one of the electrodes is ultrasonically welded to the metal tab at a region of the electrode where the undercoat layer is formed and the active material layer is not formed;

14. The energy storage device of 13 above, wherein the metal tab is made of at least one metal selected from the group consisting of aluminum, copper and nickel; and 15. A method for manufacturing an energy storage device comprising one or a plurality of the electrodes of 10 or 11 above, which method comprises the step of ultrasonically welding at least one of the electrodes to the metal tab at a region of the electrode where the undercoat layer is formed and the active material layer is not formed.

Advantageous Effects of the Invention

One advantage of this invention is that it can provide a CNT layer-containing undercoat foil for an energy storage device electrode, which undercoat foil can be ultrasonically welded efficiently.

Further advantages are that, by using an electrode having this undercoat foil, a low-resistance energy storage device and a simple and efficient method for manufacturing such devices can also be provided.

EMBODIMENT FOR CARRYING OUT THE INVENTION

The invention is described more fully below.

The undercoat foil for an energy storage device electrode (referred to below simply as the "undercoat foil") according to the invention has a current-collecting substrate and an undercoat layer formed on at least one side of the current-collecting substrate. The undercoat layer contains carbon nanotubes and has a coating weight per side of the current-collecting substrate of not more than 0.1 $g/m^2$.

The energy storage device in this invention is exemplified by various types of energy storage devices, including electrical double-layer capacitors, lithium secondary batteries, lithium-ion secondary batteries, proton polymer batteries, nickel-hydrogen batteries, solid aluminum capacitors, electrolytic capacitors and lead-acid batteries. The undercoat foil of the invention is particularly well-suited for use in electrical double-layer capacitors and lithium-ion secondary batteries.

In this invention, CNTs are used as the carbon material making up the undercoat layer.

Carbon nanotubes are generally produced by an arc discharge process, chemical vapor deposition (CVD), laser ablation or the like. The CNTs used in this invention may be obtained by any of these methods. CNTs are categorized as single-walled CNTs consisting of a single cylindrically rolled graphene sheet (abbreviated below as "SWCNTs"), double-walled CNTs consisting of two concentrically rolled graphene sheets (abbreviated below as "DWCNTs"), and multi-walled CNTs consisting of a plurality of concentrically rolled graphite sheets (abbreviated below as "MWCNTs"). SWCNTs, DWCNTs or MWCNTs may be used alone in the invention, or a plurality of these types of CNTs may be used in combination.

When SWCNTs, DWCNTs or MWCNTs are produced by the above methods, catalyst metals such as nickel, iron, cobalt or yttrium may remain in the product, and so purification to remove these impurities is sometimes necessary. Acid treatment with nitric acid, sulfuric acid or the like and ultrasonic treatment are effective for the removal of impurities. However, in acid treatment with nitric acid, sulfuric acid or the like, there is a possibility of the π-conjugated system making up the CNTs being destroyed and the properties inherent to the CNTs being lost. It is thus desirable for the CNTs to be purified and used under suitable conditions.

The undercoat layer of the invention is preferably produced by using a CNT-containing composition (dispersion) which includes CNTs, a solvent and, where necessary, a matrix polymer and/or a CNT dispersant.

The solvent is not particularly limited, provided it is one that has hitherto been used to prepare CNT-containing compositions. Illustrative examples include water and the following organic solvents: ethers such as tetrahydrofuran (THF), diethyl ether and 1,2-dimethoxyethane (DME); halogenated hydrocarbons such as methylene chloride, chloroform and 1,2-dichloroethane; amides such as N,N-dimethylformamide (DMF), N,N-dimethylacetamide (DMAc) and N-methyl-2-pyrrolidone (NMP); ketones such as acetone, methyl ethyl ketone, methyl isobutyl ketone and cyclohexanone; alcohols such as methanol, ethanol, isopropanol and n-propanol; aliphatic hydrocarbons such as n-heptane, n-hexane and cyclohexane; aromatic hydrocarbons such as benzene, toluene, xylene and ethylbenzene; glycol ethers such as ethylene glycol monoethyl ether, ethylene glycol monobutyl ether and propylene glycol monomethyl ether; and glycols such as ethylene glycol and propylene glycol. These solvents may be used singly, or two or more may be used in admixture.

In terms of being able to increase the proportion of CNTs that are individually dispersed, water, NMP, DMF, THF, methanol and isopropanol are especially preferred. These solvents may be used singly, or two or more may be used in admixture.

Illustrative examples of the matrix polymer include the following thermoplastic resins: fluoropolymers such as polyvinylidene fluoride (PVdF), polytetrafluoroethylene, tetrafluoroethylene-hexafluoropropylene copolymers, vinylidene fluoride-hexafluoropropylene copolymers (P(VDF-HFP)) and vinylidene fluoride-chlorotrifluoroethylene copolymers (P(VDF-CTFE)); polyolefin resins such as polyvinylpyrrolidone, ethylene-propylene-diene ternary copolymers, polyethylene (PE), polypropylene (PP), ethylene-vinyl acetate copolymers (EVA) and ethylene-ethyl acrylate copolymers (EEA); polystyrene resins such as polystyrene (PS), high-impact polystyrene (HIPS), acrylonitrile-styrene copolymers (AS), acrylonitrile-butadiene-styrene copolymers (ABS), methyl methacrylate-styrene copolymers (MS) and styrene-butadiene rubbers; polycarbonate resins, vinyl chloride resins, polyamide resins, polyimide resins, (meth)acrylic resins such as sodium polyacrylate and polymethyl methacrylate (PMMA), polyester resins such as polyethylene terephthalate (PET), polybutylene terephthalate, polyethylene naphthalate, polybutylene naphthalate, polylactic acid (PLA), poly-3-hydroxybutyric acid, polycaprolactone, polybutylene succinate and polyethylene succinate/adipate; polyphenylene ether resins, modified polyphenylene ether resins, polyacetal resins, polysulfone resins, polyphenylene sulfide resins, polyvinyl alcohol resins, polyglycolic acids, modified starches, cellulose acetate, carboxymethylcellulose, cellulose triacetate; chitin, chitosan and lignin; the following electrically conductive polymers: polyaniline and emeraldine base (the semi-oxidized form of polyaniline), polythiophene, polypyrrole, polyphenylene vinylene, polyphenylene and polyacetylene; and the following thermoset or photocurable resins: epoxy resins, urethane acrylate, phenolic resins, melamine resins, urea resins and alkyd resins. Because it is desirable to use water as the solvent in the conductive carbon material dispersion of the invention, the matrix polymer is preferably a water-soluble polymer such as sodium polyacrylate, carboxymethylcellulose sodium, water-soluble cellulose ether, sodium alginate, polyvinyl alcohol, polystyrene sulfonic acid or polyethylene glycol. Sodium polyacrylate and carboxymethylcellulose sodium are especially preferred.

The matrix polymer may be acquired as a commercial product. Illustrative examples of such commercial products include sodium polyacrylate (Wako Pure Chemical Industries Co., Ltd.; degree of polymerization, 2,700 to 7,500), carboxymethylcellulose sodium (Wako Pure Chemical Industries, Ltd.), sodium alginate (Kanto Chemical Co., Ltd.; extra pure reagent), the Metolose SH Series (hydroxypropylmethyl cellulose, from Shin-Etsu Chemical Co., Ltd.), the Metolose SE Series (hydroxyethylmethyl cellulose, from Shin-Etsu Chemical Co., Ltd.), JC-25 (a fully saponified polyvinyl alcohol, from Japan Vam & Poval Co., Ltd.), JM-17 (an intermediately saponified polyvinyl alcohol, from Japan Vam & Poval Co., Ltd.), JP-03 (a partially saponified polyvinyl alcohol, from Japan Vam & Poval Co., Ltd.) and polystyrenesulfonic acid (from Aldrich Co.; solids concentration, 18 wt %; aqueous solution).

The matrix polymer content, although not particularly limited, is preferably set to from about 0.0001 to about 99 wt %, and more preferably from about 0.001 to about 90 wt %, of the composition.

The CNT dispersant is not particularly limited, and may be suitably selected from hitherto used CNT dispersants. Illustrative examples include carboxymethylcellulose (CMC), polyvinylpyrrolidone (PVP), acrylic resin emulsions, water-soluble acrylic polymers, styrene emulsions, silicone emulsions, acrylic silicone emulsions, fluoropolymer emulsions, EVA emulsions, vinyl acetate emulsions, vinyl chloride emulsions, urethane resin emulsions, the triarylamine-based highly branched polymers mentioned in WO 2014/04280, and the pendant oxazoline group-containing vinyl polymers mentioned in WO 2015/029949. In this invention, the triarylamine-based highly branched polymers mentioned in WO 2014/04280 and the pendant oxazoline group-containing vinyl polymers mentioned in WO 2015/029949 are preferred.

Specifically, preferred use can be made of the highly branched polymers of formulas (1) and (2) below obtained by the condensation polymerization of a triarylamine with an aldehyde and/or a ketone under acidic conditions.

[Chemical Formula 1]

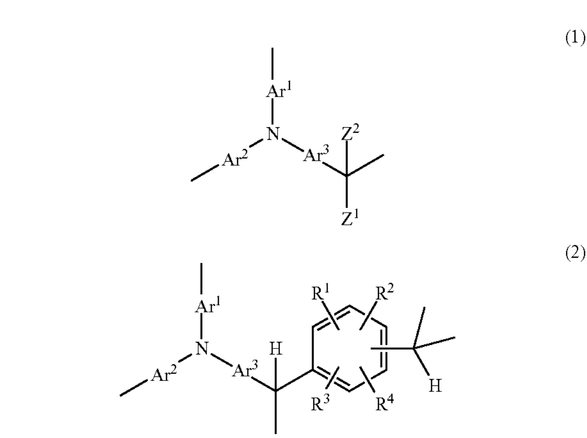

In formulas (1) and (2), $Ar^1$ to $Ar^3$ are each independently a divalent organic group of any one of formulas (3) to (7), and are preferably a substituted or unsubstituted phenylene group of formula (3).

[Chemical Formula 2]

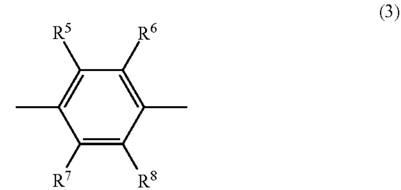

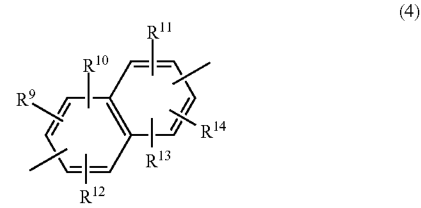

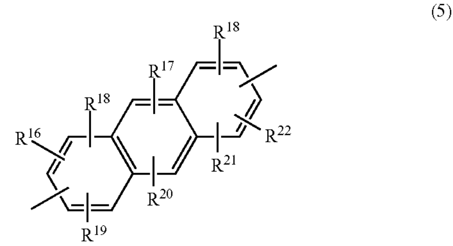

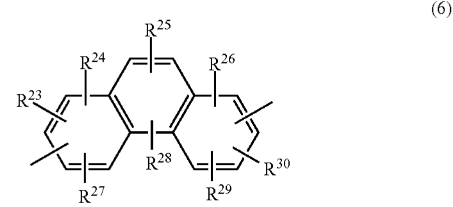

-continued (7)

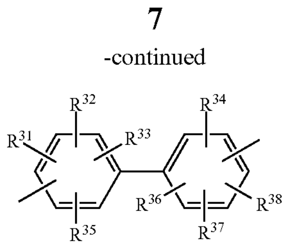

In these formulas, $R^5$ to $R^{38}$ are each independently a hydrogen atom, a halogen atom, an alkyl group of 1 to 5 carbon atoms which may have a branched structure, an alkoxy group of 1 to 5 carbon atoms which may have a branched structure, a carboxyl group, a sulfo group, a phospholic acid group, a phosphonic acid group, or a salt thereof.

In formulas (1) and (2), $Z^1$ and $Z^2$ are each independently a hydrogen atom, an alkyl group of 1 to 5 carbon atoms which may have a branched structure, or a monovalent organic group of any one of formulas (8) to (11) (provided that $Z^1$ and $Z^2$ are not both alkyl groups), with $Z^1$ and $Z^2$ preferably being each independently a hydrogen atom, a 2- or 3-thienyl group or a group of formula (8). It is especially preferable for one of $Z^1$ and $Z^2$ to be a hydrogen atom, and for the other to be a hydrogen atom, a 2- or 3-thienyl group, or a group of formula (8), especially one in which $R^{41}$ is a phenyl group or one in which $R^{41}$ is a methoxy group.

In cases where $R^{41}$ is a phenyl group, when the technique of inserting an acidic group following polymer production is used in the subsequently described acidic group insertion method, the acidic group is sometimes inserted onto the phenyl group.

The alkyl group of 1 to 5 carbon atoms that may have a branched structure is exemplified in the same way as described above.

[Chemical Formula 3]

(8)

(9)

(10)

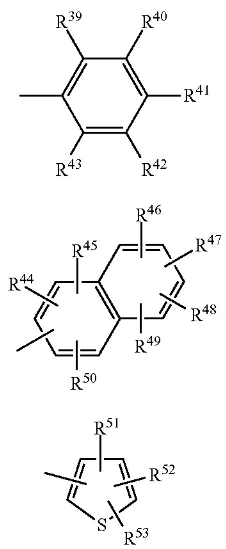

-continued (11)

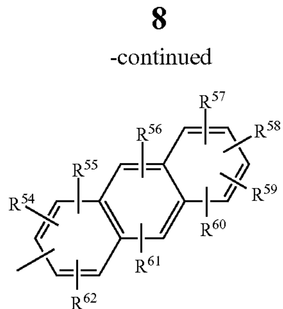

In these formulas, $R^{39}$ to $R^{62}$ are each independently a hydrogen atom, a halogen atom, an alkyl group of 1 to 5 carbon atoms which may have a branched structure, a haloalkyl group of 1 to 5 carbon atoms which may have a branched structure, a phenyl group, $OR^{63}$, $COR^{63}$, $NR^{63}R^{64}$, $COOR^{65}$ (wherein $R^{63}$ and $R^{64}$ are each independently a hydrogen atom, an alkyl group of 1 to 5 carbon atoms which may have a branched structure, a haloalkyl group of 1 to 5 carbon atoms which may have a branched structure, or a phenyl group; and $R^{65}$ is an alkyl group of 1 to 5 carbon atoms which may have a branched structure, a haloalkyl group of 1 to 5 carbon atoms which may have a branched structure, or a phenyl group), a carboxyl group, a sulfo group, a phosphoric acid group, a phosphonic acid group, or a salt thereof.

In formulas (2) to (7), $R^1$ to $R^{38}$ are each independently a hydrogen atom, a halogen atom, an alkyl group of 1 to 5 carbon atoms which may have a branched structure, an alkoxy group of 1 to 5 carbon atoms which may have a branched structure, a carboxyl group, a sulfo group, a phosphoric acid group, a phosphonic acid group, or a salt thereof.

Here, examples of halogen atoms include fluorine, chlorine, bromine and iodine atoms.

Illustrative examples of alkyl groups of 1 to 5 carbon atoms that may have a branched structure include methyl, ethyl, n-propyl, isopropyl, n-butyl, sec-butyl, tert-butyl and n-pentyl groups.

Illustrative examples of alkoxy group of 1 to 5 carbon atoms that may have a branched structure include methoxy, ethoxy, n-propoxy, isopropoxy, n-butoxy, sec-butoxy, tert-butoxy and n-pentoxy groups.

Exemplary salts of carboxyl groups, sulfo groups, phosphoric acid groups and phosphonic acid groups include sodium, potassium and other alkali metal salts; magnesium, calcium and other Group 2 metal salts, ammonium salts; propylamine, dimethylamine, triethylamine, ethylenediamine and other aliphatic amine salts; imidazoline, piperazine, morpholine and other alicyclic amine salts; aniline, diphenylamine and other aromatic amine salts; and pyridinium salts.

In formulas (8) to (11) above, $R^{39}$ to $R^{62}$ are each independently a hydrogen atom, a halogen atom, an alkyl group of 1 to 5 carbon atoms which may have a branched structure, a haloalkyl group of 1 to 5 carbon atoms which may have a branched structure, a phenyl group, $OR^{63}$, $COR^{63}$, $NR^{63}R^{64}$, $COOR^{65}$ (wherein $R^{63}$ and $R^{64}$ are each independently a hydrogen atom, an alkyl group of 1 to 5 carbon atoms which may have a branched structure, a haloalkyl group of 1 to 5 carbon atoms which may have a branched structure, or a phenyl group; and $R^{65}$ is an alkyl group of 1 to 5 carbon atoms which may have a branched structure, a haloalkyl group of 1 to 5 carbon atoms which may have a branched structure, or a phenyl group), a carboxyl group, a sulfo group, a phosphoric acid group, a phosphonic acid group, or a salt thereof.

Here, illustrative examples of the haloalkyl group of 1 to 5 carbon atoms which may have a branched structure include difluoromethyl, trifluoromethyl, bromodifluoromethyl, 2-chloroethyl, 2-bromoethyl, 1,1-difluoroethyl, 2,2,2-trifluoroethyl, 1,1,2,2-tetrafluoroethyl, 2-chloro-1,1,2-trifluoroethyl, pentafluoroethyl, 3-bromopropyl, 2,2,3,3-tetrafluoropropyl, 1,1,2,3,3,3-hexafluoropropyl, 1,1,1,3,3,3-hexafluoropropan-2-yl, 3-bromo-2-methylpropyl, 4-bromobutyl and perfluoropentyl groups.

The halogen atoms and the alkyl groups of 1 to 5 carbon atoms which may have a branched structure are exemplified in the same way as the groups represented by above formulas (2) to (7).

In particular, to further increase adherence to the current-collecting substrate, the highly branched polymer is preferably one having, on at least one aromatic ring in the recurring unit of formula (1) or (2), at least one type of acidic group selected from among carboxyl, sulfo, phosphoric acid and phosphonic acid groups and salts thereof, and more preferably one having a sulfo group or a salt thereof.

Illustrative examples of aldehyde compounds that may be used to prepare the highly branched polymer include saturated aliphatic aldehydes such as formaldehyde, p-formaldehyde, acetaldehyde, propylaldehyde, butylaldehyde, isobutylaldehyde, valeraldehyde, capronaldehyde, 2-methylbutylaldehyde, hexylaldehyde, undecylaldehyde, 7-methoxy-3,7-dimethyloctylaldehyde, cyclohexanecarboxyaldehyde, 3-methyl-2-butylaldehyde, glyoxal, malonaldehyde, succinaldehyde, glutaraldehyde and adipinaldehyde; unsaturated aliphatic aldehydes such as acrolein and methacrolein; heterocyclic aldehydes such as furfural, pyridinealdehyde and thiophenealdehyde; aromatic aldehydes such as benzaldehyde, tolylaldehyde, trifluoromethylbenzaldehyde, phenylbenzaldehyde, salicylaldehyde, anisaldehyde, acetoxybenzaldehyde, terephthalaldehyde, acetylbenzaldehyde, formylbenzoic acid, methyl formylbenzoate, aminobenzaldehyde, N,N-dimethylaminobenzaldehyde, N,N-diphenylaminobenzaldehyde, naphthylaldehyde, anthrylaldehyde and phenathrylaldehyde; and aralkylaldehydes such as phenylacetaldehyde and 3-phenylpropionaldehyde. Of these, the use of aromatic aldehydes is preferred.

Ketone compounds that may be used to prepare the highly branched polymer are exemplified by alkyl aryl ketones and diaryl ketones. Illustrative examples include acetophenone, propiophenone, diphenyl ketone, phenyl naphthyl ketone, dinaphthyl ketone, phenyl tolyl ketone and ditolyl ketone.

The average molecular weight of the highly branched polymer is not particularly limited, although the weight-average molecular weight is preferably from 1,000 to 2,000,000, and more preferably from 2,000 to 1,000,000.

The weight-average molecular weights in this invention are polystyrene-equivalent measured values obtained by gel permeation chromatography.

Specific examples of the highly branched polymer include, but are not limited to, those having the following formulas.

[Chemical Formula 4]

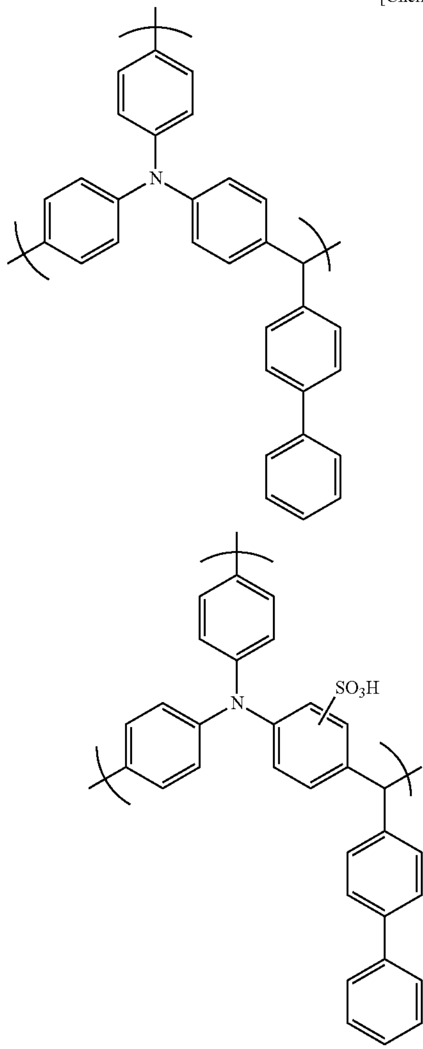

The pendant oxazoline group-containing vinyl polymer (referred to below as the "oxazoline polymer") is preferably a polymer which is obtained by the radical polymerization of an oxazoline monomer of formula (13) having a polymerizable carbon-carbon double bond-containing group at the 2 position, and which has repeating units that are bonded at the 2 position of the oxazoline ring to the polymer backbone or to spacer groups.

[Chemical Formula 5]

(13)

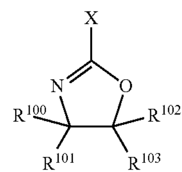

Here, X represents a polymerizable carbon-carbon double bond-containing group, and $R^{100}$ to $R^{103}$ are each independently a hydrogen atom, a halogen atom, an alkyl group of 1 to 5 carbon atoms that may have a branched structure, an aryl group of 6 to 20 carbon atoms, or an aralkyl group of 7 to 20 carbon atoms.

The polymerizable carbon-carbon double bond-containing group on the oxazoline monomer is not particularly limited, so long as it includes a polymerizable carbon-carbon double bond. However, an acyclic hydrocarbon group containing a polymerizable carbon-carbon double bond is preferable. For example, alkenyl groups having from 2 to 8 carbon atoms, such as vinyl, allyl and isopropenyl groups, are preferred.

The halogen atoms and the alkyl groups of 1 to 5 carbon atoms which may have a branched structure are exemplified in the same way as above.

Illustrative examples of aryl groups of 6 to 20 carbon atoms include phenyl, xylyl, tolyl, biphenyl and naphthyl groups.

Illustrative examples of aralkyl groups of 7 to 20 carbon atoms include benzyl, phenylethyl and phenylcyclohexyl groups.

Illustrative examples of the oxazoline monomer having a polymerizable carbon-carbon double bond-containing group at the 2 position shown in formula (13) include 2-vinyl-2-oxazoline, 2-vinyl-4-methyl-2-oxazoline, 2-vinyl-4-ethyl-2-oxazoline, 2-vinyl-4-propyl-2-oxazoline, 2-vinyl-4-butyl-2-oxazoline, 2-vinyl-5-methyl-2-oxazoline, 2-vinyl-5-ethyl-2-oxazoline, 2-vinyl-5-propyl-2-oxazoline, 2-vinyl-5-butyl-2-oxazoline, 2-isopropenyl-2-oxazoline, 2-isopropenyl-4-methyl-2-oxazoline, 2-isopropenyl-4-ethyl-2-oxazoline, 2-isopropenyl-4-propyl-2-oxazoline, 2-isopropenyl-4-butyl-2-oxazoline, 2-isopropenyl-5-methyl-2-oxazoline, 2-isopropenyl-5-ethyl-2-oxazoline, 2-isopropenyl-5-propyl-2-oxazoline and 2-isopropenyl-5-butyl-2-oxazoline. In terms of availability, 2-isopropenyl-2-oxazoline is preferred.

Also, from the standpoint of preparing the CNT-containing composition using an aqueous solvent, it is preferable for the oxazoline polymer to be water-soluble.

Such a water-soluble oxazoline polymer may be a homopolymer of the oxazoline monomer of formula (13) above. However, to further increase the solubility in water, the polymer is preferably one obtained by the radical polymerization of at least two types of monomer: the above oxazoline monomer, and a hydrophilic functional group-containing (meth)acrylic ester monomer.

Illustrative examples of hydrophilic functional group-containing (meth)acrylic monomers include (meth)acrylic acid, 2-hydroxyethyl acrylate, methoxy polyethylene glycol acrylate, monoesterified products of acrylic acid and polyethylene glycol, 2-aminoethyl acrylate and salts thereof, 2-hydroxyethyl methacrylate, methoxy polyethylene glycol methacrylate, monoesterified products of methacrylic acid and polyethylene glycol, 2-aminoethyl methacrylate and salts thereof, sodium (meth)acrylate, ammonium (meth) acrylate, (meth)acrylonitrile, (meth)acrylamide, N-methylol (meth)acrylamide, N-(2-hydroxyethyl) (meth)acrylamide and sodium styrenesulfonate. These may be used singly, or two or more may be used in combination. Of these, methoxy polyethylene glycol (meth)acrylate and monoesterified products of (meth)acrylic acid and polyethylene glycol are preferred.

Concomitant use may be made of monomers other than the oxazoline monomer and the hydrophilic functional group-containing (meth)acrylic monomer, provided that doing so does not adversely affect the ability of the oxazoline polymer to disperse CNTs.

Illustrative examples of such other monomers include (meth)acrylic ester monomers such as methyl (meth)acrylate, ethyl (meth)acrylate, butyl (meth)acrylate, 2-ethylhexyl (meth)acrylate, stearyl (meth)acrylate, perfluoroethyl (meth) acrylate and phenyl (meth)acrylate; α-olefin monomers such as ethylene, propylene, butene and pentene; haloolefin monomers such as vinyl chloride, vinylidene chloride and vinyl fluoride; styrene monomers such as styrene and α-methylstyrene; vinyl carboxylate monomers such as vinyl acetate and vinyl propionate; and vinyl ether monomers such as methyl vinyl ether and ethyl vinyl ether. These may each be used singly, or two or more may be used in combination.

In terms of further increasing the CNT dispersing ability of the resulting oxazoline polymer, the content of oxazoline monomer in the monomer ingredients used to prepare the oxazoline polymer employed in the invention is preferably at least 10 wt %, more preferably at least 20 wt %, and even more preferably at least 30 wt %. The upper limit in the content of the oxazoline monomer in the monomer ingredients is 100 wt %, in which case a homopolymer of the oxazoline monomer is obtained.

To further increase the water solubility of the resulting oxazoline polymer, the content of the hydrophilic functional group-containing (meth)acrylic monomer in the monomer ingredients is preferably at least 10 wt %, more preferably at least 20 wt %, and even more preferably at least 30 wt %.

As mentioned above, the content of other monomers in the monomer ingredients is in a range that does not affect the ability of the resulting oxazoline polymer to disperse CNTs. This content differs according to the type of monomer and thus cannot be strictly specified, but may be suitably set in a range of from 5 to 95 wt %, and preferably from 10 to 90 wt %.

The average molecular weight of the oxazoline polymer is not particularly limited, although the weight-average molecular weight is preferably from 1,000 to 2,000,000, and more preferably from 2,000 to 1,000,000.

The oxazoline polymer that may be used in this invention can be synthesized by a known radical polymerization of the above monomers or can be acquired as a commercial product. Illustrative examples of such commercial products include Epocros WS-300 (from Nippon Shokubai Co., Ltd.; solids concentration, 10 wt %; aqueous solution), Epocros WS-700 (Nippon Shokubai Co., Ltd.; solids concentration, 25 wt %; aqueous solution), Epocros WS-500 (Nippon Shokubai Co., Ltd.; solids concentration, 39 wt %; water/1-methoxy-2-propanol solution), Poly(2-ethyl-2-oxazoline) (Aldrich), Poly(2-ethyl-2-oxazoline) (Alfa Aesar), and Poly (2-ethyl-2-oxazoline) (VWR International, LLC).

When the oxazoline polymer is commercially available as a solution, the solution may be used directly as is or may be used after replacing the solvent with a target solvent.

The mixing ratio of the CNTs and the dispersant in the CNT-containing composition used in the invention, expressed as a weight ratio, may be set to from about 1,000:1 to about 1:100.

The concentration of dispersant in the composition is not particularly limited, provided it is a concentration that enables the CNTs to disperse in the solvent. However, the concentration in the composition is preferably set to from about 0.001 to about 30 wt %, and more preferably to from about 0.002 to about 20 wt %.

The concentration of CNTs in the composition varies according to the coating weight of the target undercoat layer and the required mechanical, electrical and thermal characteristics, and may be any concentration at which at least some portion of the CNTs individually disperse and the undercoat layer can be produced at the coating weight specified in this invention. The concentration of CNTs in the composition is preferably from about 0.0001 to about 30 wt %, more preferably from about 0.001 to about 20 wt %, and even more preferably from about 0.001 to about 10 wt %.

The CNT-containing composition used in the invention may include a crosslinking agent that gives rise to a crosslinking reaction with the dispersant used, or a crosslinking agent that is self-crosslinking. These crosslinking agents preferably dissolve in the solvent that is used.

Crosslinking agents of triarylamine-based highly branched polymers are exemplified by melamine crosslinking agents, substituted urea crosslinking agents, and crosslinking agents which are polymers thereof. These crosslinking agents may be used singly, or two or more may be used in admixture. A crosslinking agent having at least two crosslink-forming substituents is preferred. Illustrative examples of such crosslinking agents include compounds such as CYMEL®, methoxymethylated glycoluril, butoxymethylated glycoluril, methylolated glycoluril, methoxymethylated melamine, butoxymethylated melamine, methylolated melamine, methoxymethylated benzoguanamine, butoxymethylated benzoguanamine, methylolated benzoguanamine, methoxymethylated urea, butoxymethylated urea, methylolated urea, methoxymethylated thiourea, methoxymethylated thiourea and methylolated thiourea, as well as condensates of these compounds.

Crosslinking agent of oxazoline polymer is not particularly limited, provided it is a compound having two or more functional groups that react with oxazoline groups, such as carboxyl, hydroxyl, thiol, amino, sulfinic acid and epoxy groups. A compound having two or more carboxyl groups is preferred. A compound which has functional groups such as the sodium, potassium, lithium or ammonium salts of carboxylic acids that, under heating during thin-film formation or in the presence of an acid catalyst, generate the above functional groups and give rise to crosslinking reactions, may also be used as the crosslinking agent.

Examples of compounds which give rise to crosslinking reactions with oxazoline groups include the metal salts of synthetic polymers such as polyacrylic acid and copolymers thereof or of natural polymers such as carboxymethylcellulose or alginic acid which give rise to crosslink reactivity in the presence of an acid catalyst, and ammonium salts of these same synthetic polymers and natural polymers which give rise to crosslink reactivity under heating. Sodium polyacrylate, lithium polyacrylate, ammonium polyacrylate, carboxymethylcellulose sodium, carboxymethylcellulose lithium and carboxymethylcellulose ammonium, which give rise to crosslink reactivity in the presence of an acid catalyst or under heating conditions, are especially preferred.

These compounds that give rise to crosslinking reactions with oxazoline groups may be acquired as commercial products. Examples of such commercial products include sodium polyacrylate (Wako Pure Chemical Industries Co., Ltd.; degree of polymerization, 2,700 to 7,500), carboxymethylcellulose sodium (Wako Pure Chemical Industries, Ltd.), sodium alginate (Kanto Chemical Co., Ltd.; extra pure reagent), Aron A-30 (ammonium polyacrylate, from Toagosei Co., Ltd.; solids concentration, 32 wt %; aqueous solution), DN-800H (carboxymethylcellulose ammonium, from Daicel FineChem, Ltd.), and ammonium alginate (Kimica Corporation).

Examples of crosslinking agents that are self-crosslinking include compounds having, on the same molecule, crosslinkable functional groups which react with one another, such as a hydroxyl group with an aldehyde group, epoxy group, vinyl group, isocyanate group or alkoxy group; a carboxyl group with an aldehyde group, amino group, isocyanate group or epoxy group; or an amino group with an isocyanate group or aldehyde group; and compounds having like crosslinkable functional groups which react with one another, such as hydroxyl groups (dehydration condensation), mercapto groups (disulfide bonding), ester groups (Claisen condensation), silanol groups (dehydration condensation), vinyl groups and acrylic groups.

Specific examples of crosslinking agents that are self-crosslinking include any of the following which exhibit crosslink reactivity in the presence of an acid catalyst: polyfunctional acrylates, tetraalkoxysilanes, and block copolymers of a blocked isocyanate group-containing monomer and a monomer having at least one hydroxyl, carboxyl or amino group.

Such self-crosslinking compounds may be acquired as commercial products. Examples of commercial products include polyfunctional acrylates such as A-9300 (ethoxylated isocyanuric acid triacrylate, from Shin-Nakamura Chemical Co., Ltd.), A-GLY-9E (Ethoxylated glycerine triacrylate (EO 9 mol), from Shin-Nakamura Chemical Co., Ltd.) and A-TMMT (pentaerythritol tetraacrylate, from Shin-Nakamura Chemical Co., Ltd.); tetraalkoxysilanes such as tetramethoxysilane (Tokyo Chemical Industry Co., Ltd.) and tetraethoxysilane (Toyoko Kagaku Co., Ltd.); and blocked isocyanate group-containing polymers such as the Elastron Series E-37, H-3, H38, BAP, NEW BAP-15, C-52, F-29, W-11P, MF-9 and MF-25K (DKS Co., Ltd.).

The amount in which these crosslinking agents is added varies according to, for example, the solvent to be used, the substrate to be used, the viscosity required and the film shape required, but is generally from 0.001 to 80 wt %, preferably from 0.01 to 50 wt %, and more preferably from 0.05 to 40 wt %, based on the dispersant. These crosslinking agents, although they sometimes give rise to crosslinking reactions due to self-condensation, induce crosslinking reactions with the dispersant. In cases where crosslinkable substituents are present in the dispersant, crosslinking reactions are promoted by these crosslinkable substituents.

In the present invention, the following may be added as catalysts for promoting the crosslinking reaction: acidic compounds such as p-toluenesulfonic acid, trifluoromethanesulfonic acid, pyridinium p-toluenesulfonic acid, salicylic acid, sulfosalicylic acid, citric acid, benzoic acid, hydroxybenzoic acid and naphthalenecarboxylic acid, and/or thermal acid generators such as 2,4,4,6-tetrabromocyclohexadienone, benzoin tosylate, 2-nitrobenzyl tosylate and alkyl esters of organic sulfonic acids.

The amount of catalyst added with respect to the CNT dispersant is from 0.0001 to 20 wt %, preferably from 0.0005 to 10 wt %, and more preferably from 0.001 to 3 wt %.

The method of preparing the CNT-containing composition used to form the undercoat layer is not particularly limited. The dispersion may be prepared by the mixture of, in any order: the CNTs and the solvent, and also the dispersant, matrix polymer and crosslinking agent that may be optionally used.

The mixture at this time is preferably dispersion treated. Such treatment enables the proportion of the CNTs that are dispersed to be further increased. Examples of dispersion treatment include mechanical treatment in the form of wet treatment using, for example, a ball mill, bead mill or jet mill, or in the form of ultrasonic treatment using a bath-type or probe-type sonicator. Wet treatment using a jet mill and ultrasonic treatment are especially preferred.

The dispersion treatment may be carried out for any length of time, although a period of from about 1 minute to about 10 hours is preferred, and a period of from about 5 minutes to about 5 hours is even more preferred. If necessary, heat treatment may be carried out at this time.

When a crosslinking agent and/or a matrix polymer are used, these may be added following preparation of a mixture composed of the dispersant, the CNTs and the solvent.

The undercoat foil of the invention can be produced by coating the above-described CNT-containing composition onto at least one side of a current-collecting substrate, then drying the applied composition in air or under heating to form an undercoat layer.

It is preferable to coat the CNT-containing composition over the entire surface of the current-collecting substrate so as to form an undercoat layer over the entire surface of the current-collecting substrate.

In the practice of the invention, to efficiently unite the undercoat foil and the subsequently described metal tab by welding, such as ultrasonic welding, at an undercoat layer region on the foil, the coating weight of the undercoat layer per side of the current-collecting substrate is set to not more than 0.1 $g/m^2$, preferably not more than 0.09 $g/m^2$, and more preferably not more than 0.05 $g/m^2$.

On the other hand, to ensure that the undercoat layer functions and to reproducibly obtain batteries having excellent characteristics, the coating weight of the undercoat layer per side of the current collector is preferably at least 0.001 $g/m^2$, more preferably at least 0.005 $g/m^2$, even more preferably at least 0.01 $g/m^2$, and still more preferably at least 0.015 $g/m^2$.

The thickness of the undercoat layer is not particularly limited, so long as the above coating weight is satisfied. However, for a good welding efficiency and to lower the internal resistance of the resulting device, the thickness is preferably from 0.01 to 10 μm.

The coating weight of the undercoat layer in this invention is the ratio of the undercoat layer weight (g) to the undercoat layer surface area ($m^2$). When the undercoat layer has been formed in a pattern, this surface area is the surface area of the undercoat layer alone and does not include the surface area of the current-collecting substrate that lies exposed between areas of the patterned undercoat layer.

The weight of the undercoat layer can be determined by, for example, cutting out a test specimen of a suitable size from the undercoat foil and measuring its weight W0, subsequently peeling the undercoat layer from the undercoat foil and measuring the weight W1 after the undercoat layer has been removed, and calculating the difference therebetween (W0−W1). Alternatively, the weight of the undercoat layer can be determined by first measuring the weight W2 of the current-collecting substrate, subsequently measuring the weight W3 of the undercoat foil after forming the undercoat layer, and calculating the difference therebetween (W3−W2).

The method used to peel off the undercoat layer may involve, for example, immersing the undercoat layer in a solvent which dissolves the undercoat layer or causes it to swell, and then wiping off the undercoat layer with a cloth or the like.

The coating weight can be adjusted by a known method. For example, in cases where the undercoat layer is formed by coating, the coating weight can be adjusted by varying the solids concentration of the undercoat layer-forming coating fluid (CNT-containing composition), the number of coating passes or the clearance of the coating fluid delivery opening in the coater.

When one wishes to raise the coating weight, this is done by making the solids concentration higher, increasing the number of coating passes or making the clearance larger. When one wishes to lower the coating weight, this is done by making the solids concentration lower, reducing the number of coating passes or making the clearance smaller.

The current-collecting substrate may be suitably selected from among those which have hitherto been used as current-collecting substrates for energy storage device electrodes. For example, use can be made of thin films of copper, aluminum, nickel, gold, silver and alloys thereof, and of carbon materials, metal oxides and conductive polymers. In cases where welding such as ultrasonic welding is carried out to produce the electrode assembly, the use of metal foil made of copper, aluminum, nickel, gold, silver or an alloy thereof is preferred.

The thickness of the current-collecting substrate is not particularly limited, although a thickness of from 1 to 100 μm is preferred in this invention.

Examples of the method for applying the CNT-containing composition include spin coating, dip coating, flow coating, inkjet printing, spray coating, bar coating, gravure coating, slit coating, roll coating, flexographic printing, transfer printing, brush coating, blade coating and air knife coating. From the standpoint of work efficiency and other considerations, inkjet printing, casting, dip coating, bar coating, blade coating, roll coating, gravure coating, flexographic printing and spray coating are preferred.

The temperature during drying under applied heat, although not particularly limited, is preferably from about 50° C. to about 200° C., and more preferably from about 80° C. to about 150° C.

The energy storage device electrode of the invention can be produced by forming an active material layer on the undercoat layer of the undercoat foil.

The active material used here may be any of the various types of active materials that have hitherto been used in energy storage device electrodes.

For example, in the case of lithium secondary batteries and lithium-ion secondary batteries, chalcogen compounds capable of intercalating and deintercalating lithium ions, lithium ion-containing chalcogen compounds, polyanion compounds, elemental sulfur and sulfur compounds may be used as the positive electrode active material.

Illustrative examples of such chalcogen compounds capable of intercalating and deintercalating lithium ions include $FeS_2$, $TiS_2$, $MoS_2$, $V_2O_6$, $V_6O_{13}$ and $MnO_2$.

Illustrative examples of lithium ion-containing chalcogen compounds include $LiCoO_2$, $LiMnO_2$, $LiMn_2O_4$, $LiM_2O_4$, $LiV_3O_8$, $LiNiO_2$ and $Li_xNi_yM_{1-y}O_2$ (wherein M is one or more metal element selected from cobalt, manganese, titanium, chromium, vanadium, aluminum, tin, lead and zinc; and the conditions $0.05 \leq x \leq 1.10$ and $0.5 \leq y \leq 1.0$ are satisfied).

An example of a polyanion compound is $LiFePO_4$.

Illustrative examples of sulfur compounds include $Li_2S$ and rubeanic acid.

The following may be used as the negative electrode active material making up the negative electrode: alkali metals, alkali alloys, at least one elemental substance selected from among group 4 to 15 elements of the periodic table which intercalate and deintercalate lithium ions, as well as oxides, sulfides and nitrides thereof, and carbon materials which are capable of reversibly intercalating and deintercalating lithium ions.

Illustrative examples of the alkali metals include lithium, sodium and potassium. Illustrative examples of the alkali metal alloys include Li—Al, Li—Mg, Li—Al—Ni, Na—Hg and Na—Zn.

Illustrative examples of the at least one elemental substance selected from among group 4 to 15 elements of the periodic table which intercalate and deintercalate lithium ions include silicon, tin, aluminum, zinc and arsenic.

Illustrative examples of the oxides include tin silicon oxide ($SnSiO_3$), lithium bismuth oxide ($Li_3BiO_4$), lithium zinc oxide ($Li_2ZnO_2$) and lithium titanium oxide ($Li_4Ti_5O_{12}$).

Illustrative examples of the sulfides include lithium iron sulfides ($Li_xFeS_2$ ($0 \leq x \leq 3$)) and lithium copper sulfides ($Li_xCuS$ ($0 \leq x \leq 3$)).

Exemplary nitrides include lithium-containing transition metal nitrides, illustrative examples of which include $Li_xM_yN$ (wherein M is cobalt, nickel or copper; $0 \leq x \leq 3$, and $0 \leq y \leq 0.5$) and lithium iron nitride ($Li_3FeN_4$).

Examples of carbon materials which are capable of reversibly intercalating and deintercalating lithium ions include graphite, carbon black, coke, glassy carbon, carbon fibers, carbon nanotubes, and sintered compacts of these.

In the case of electrical double-layer capacitors, a carbonaceous material may be used as the active material.

The carbonaceous material is exemplified by activated carbon, such as activated carbon obtained by carbonizing a phenolic resin, then subjecting the carbonized resin to activation treatment.

The active material layer may be formed by coating an electrode slurry containing the above-described active material, a binder polymer and, optionally, a solvent onto the undercoat layer, then drying in air or under heating.

The region where the active material layer is formed should be suitably selected according to the cell configuration and other characteristics of the device to be used, and may be the entire surface of the undercoat layer or part of that surface. However, when an electrode assembly in which a metal tab and the electrode are joined together by welding such as ultrasonic welding is intended for use in a laminate cell, for example, in order to leave a welding region, it is preferable to form the active material layer by coating the electrode slurry over part of the undercoat layer surface. In laminate cell applications, it is especially preferable to form the active material layer by coating the electrode slurry onto all regions of the undercoat layer other than a peripheral edge thereof.

A known material may be suitably selected and used as the binder polymer. Illustrative examples include electrically conductive polymers such as polyvinylidene fluoride (PVdF), polyvinylpyrrolidone, polytetrafluoroethylene, tetrafluoroethylene-hexafluoropropylene copolymers, vinylidene fluoride-hexafluoropropylene copolymers (P(VDF-HFP)), vinylidene fluoride-chlorotrifluoroethylene copolymers (P(VDF-CTFE)), polyvinyl alcohols, polyimides, ethylene-propylene-diene ternary copolymers, styrene-butadiene rubbers, carboxymethylcellulose (CMC), polyacrylic acid (PAA) and polyaniline.

The amount of binder polymer added per 100 parts by weight of the active material is preferably from 0.1 to 20 parts by weight, and more preferably from 1 to 10 parts by weight.

The solvent is exemplified by the solvents mentioned above for the CNT-containing composition. The solvent may be suitably selected from among these according to the type of binder, although NMP is preferred in the case of water-insoluble binders such as PVdF, and water is preferred in the case of water-soluble binders such as PAA.

The electrode slurry may also contain a conductive additive. Illustrative examples of conductive additives include carbon black, ketjen black, acetylene black, carbon whiskers, carbon fibers, natural graphite, synthetic graphite, titanium oxide, ruthenium oxide, aluminum and nickel.

The method of applying the electrode slurry is exemplified by the same techniques as mentioned above for the CNT-containing composition.

The temperature when drying under applied heat, although not particularly limited, is preferably from about 50° C. to about 400° C., and more preferably from about 80° C. to about 150° C.

The electrode may be optionally pressed. Any commonly used method may be employed for pressing, although a mold pressing or roll pressing method is especially preferred. The pressing force in roll pressing, although not particularly limited, is preferably from 0.2 to 3 ton/cm.

The energy storage device of the invention is equipped with the above-described energy storage device electrode. More specifically, it is constructed of at least a pair of positive and negative electrodes, a separator between these electrodes, and an electrolyte, with at least one of the positive and negative electrodes being the above-described energy storage device electrode.

Because this energy storage device is characterized by the use, as an electrode therein, of the above-described energy storage device electrode, the separator, electrolyte, and other constituent members of the device that are used may be suitably selected from known materials.

Illustrative examples of the separator include cellulose-based separators and polyolefin-based separators.

The electrolyte may be either a liquid or a solid, and moreover may be either aqueous or non-aqueous, the energy storage device electrode of the invention being capable of exhibiting a performance sufficient for practical purposes even when employed in devices that use a non-aqueous electrolyte.

The non-aqueous electrolyte is exemplified by a non-aqueous electrolyte solution obtained by dissolving an electrolyte salt in a non-aqueous organic solvent.

Illustrative examples of the electrolyte salt include lithium salts such as lithium tetrafluoroborate, lithium hexafluorophosphate, lithium perchlorate and lithium trifluoromethanesulfonate; quaternary ammonium salts such as tetramethylammonium hexafluorophosphate, tetraethylammonium hexafluorophosphate, tetrapropylammonium hexafluorophosphate, methyltriethylammonium hexafluorophosphate, tetraethylammonium tetrafluoroborate and tetraethylammonium perchlorate; and lithium bis(trifluoromethanesulfonyl)imide and lithium bis(fluorosulfonyl)imide.

Illustrative examples of non-aqueous organic solvents include alkylene carbonates such as propylene carbonate, ethylene carbonate and butylene carbonate, dialkyl carbonates such as dimethyl carbonate, methyl ethyl carbonate and diethyl carbonate, nitriles such as acetonitrile, and amides such as dimethylformamide.

The configuration of the energy storage device is not particularly limited. Cells of various known configurations, such as cylindrical cells, flat wound prismatic cells, stacked prismatic cells, coin cells, flat wound laminate cells and stacked laminate cells may be used.

When used in a coil cell, the energy storage device electrode of the invention may be die-cut in a specific disk shape and used.

For example, a coin cell may be produced by setting a given number of pieces of lithium foil that have been die-cut to a specific shape on a coin cell cap to which a washer and a spacer have been welded, laying an electrolyte solution-impregnated separator of the same shape on top of the foil, stacking the energy storage device electrode of the invention on top of the separator with the active material layer facing down, placing the coin cell case and a gasket thereon and sealing the cell with a coin cell crimper.

In a stacked laminate cell, use may be made of an electrode assembly obtained by welding a metal tab at, in an electrode where an active material layer has been formed on part of the undercoat layer surface, a region of the electrode where the undercoat layer is formed and the active material layer is not formed (welding region).

The electrode making up the electrode assembly may be a single plate or a plurality of plates, although a plurality of plates are generally used in both the positive and the negative electrodes.

The plurality of electrode plates used to form the positive electrode are preferably stacked in alternation one plate at a time with the plurality of electrode plates that are used to form the negative electrode. It is preferable at this time to interpose the above-described separator between the positive electrode and the negative electrode.

A metal tab may be welded to a welding region on the outermost electrode of the plurality of electrodes, or a metal tab may be welded between the welding regions on any two adjoining electrode plates.

The metal tab material is not particularly limited, provided it is one that is commonly used in energy storage devices. Examples include metals such as nickel, aluminum, titanium and copper; and alloys such as stainless steel, nickel alloys, aluminum alloys, titanium alloys and copper alloys. From the standpoint of welding efficiency, it is preferable for the tab material to include at least one metal selected from aluminum, copper and nickel.

The metal tab has a shape that is preferably in the form of foil, with the thickness being preferably from about 0.05 to about 1 mm.

Known methods for welding together metals may be used as the welding method. Examples include TIG welding, spot welding, laser welding and ultrasonic welding. As mentioned above, because the undercoat layer of the invention is set to a coating weight that is particularly suitable for ultrasonic welding, it is preferable to join together the electrode and the metal tab by ultrasonic welding.

Ultrasonic welding methods are exemplified by a technique in which a plurality of electrodes are placed between an anvil and a horn, the metal tab is placed at the welding regions, and welding is carried out collectively by the application of ultrasonic energy; and a technique in which the electrodes are first welded together, following which the metal tab is welded.

In this invention, with either of these techniques, not only are the metal tab and the electrodes welded together at the welding regions, the plurality of electrodes are ultrasonically welded to each other at a region where the undercoat layer is formed and the active material layer is not formed.

The pressure, frequency, output power, treatment time, etc. during welding are not particularly limited, and may be suitably set while taking into account the material to be used and the coating weight and other characteristics of the undercoat layer.

A laminate cell can be obtained by placing the electrode assembly produced as described above within a laminate pack, injecting the electrolyte solution described above, and subsequently heat sealing.

The energy storage device obtained in this way has at least one electrode assembly made up of a metal tab and one or a plurality of electrodes, the electrode has a current-collecting substrate, an undercoat layer formed on at least one side of the current-collecting substrate and an active material layer formed on part of the surface of this undercoat layer, and the undercoat layer includes CNTs and has a coating weight per side of the current-collecting substrate of not more than 0.1 g/m$^2$. In cases where a plurality of electrodes are used, the electrode assembly has a construction wherein these electrodes are ultrasonically welded to each other at a region where the undercoat layer is formed and the active material layer is not formed, and wherein at least one of the electrodes is ultrasonically welded with a metal tab at a region where the undercoat layer is formed but the active material layer is not formed.

EXAMPLES

Working Examples and Comparative Examples are given below to more fully illustrate the invention, although the invention is not limited by these Examples. The instruments used in the Examples were as follows.

(1) Probe-type ultrasonicator (dispersion treatment):
 Instrument: UIP1000 (Hielscher Ultrasonics GmbH)
(2) Wire bar coater (thin-film production):
 Instrument: PM-9050MC (SMT Co., Ltd.)
(3) Ultrasonic welder (ultrasonic welding test)
 Instrument: 2000Xea (40:0.8/40MA-XaeStand), from Emerson Japan, Ltd.
(4) Charge/discharge measurement system (evaluation of secondary battery):
 Instrument: HJ1001 SM8A (Hokuto Denko Corporation)
(5) Micrometer (measurement of binder and active material layer thicknesses):
 Instrument: IR54 (Mitutoyo Corporation)
(6) Homogenizing disperser (mixing of electrode slurry)
 Instrument: T.K. Robomix (with Homogenizing Disperser model 2.5 (32 mm dia.)), from Primix Corporation
(7) Thin-film spin-type high-speed mixer (mixing of electrode slurry)
 Instrument: Filmix model 40 (Primix Corporation)
(8) Planetary centrifugal mixer (degassing of electrode slurry)
 Instrument: Thinky Mixer ARE-310 (Thinky)
(9) Roll press (compressing of electrode):
 Instrument: HSR-60150H ultra-small desktop hot roll press (Hohsen Corporation)

[1] Production of Undercoat Foil

Comparative Example 1-1

First, 0.50 g of PTPA-PBA-$SO_3H$ having the formula shown below and synthesized by the same method as in Synthesis Example 2 of WO 2014/042080 was dissolved as the dispersant in 43 g of 2-propanol and 6.0 g of water as the dispersion media, and 0.50 g of MWCNTs (NC7000, from Nanocyl; diameter, 10 nm) was added to the resulting solution. This mixture was ultrasonically treated for 30 minutes at room temperature (about 25° C.) using a probe-type ultrasonicator, thereby giving a black MWCNT-containing dispersion in which MWCNTs were uniformly dispersed and which was free of precipitate.

Next, 3.88 g of the polyacrylic acid (PAA)-containing aqueous solution Aron A-10H (solids concentration, 25.8 wt %; from Toagosei Co., Ltd.) and 46.12 g of 2-propanol were added to 50 g of the resulting MWCNT-containing dispersion and stirring was carried out, giving Undercoat Slurry A1.

The resulting Undercoat Slurry A1 was uniformly spread with a wire bar coater (OSP 13, wet film thickness, 13 μm)

onto aluminum foil (thickness, 20 μm) as the current-collecting substrate and subsequently dried for 20 minutes at 120° C. to form an undercoat layer, thereby producing Undercoat Foil B1. Twenty pieces of the undercoat foil cut to dimensions of 5×10 cm were prepared and their weights were measured, following which the weight of the metal foil after rubbing off the undercoat layer using paper permeated with a 1:1 (weight ratio) mixture of 2-propanol and water was measured. The coating weight of the undercoat layer, as calculated from the weight difference in the undercoat foil before and after rubbing off the undercoat layer, was 0.167 g/m$^2$.

In addition, Undercoat Slurry A1 was similarly coated as well onto the opposite side of Undercoat Foil B1 and dried, thereby producing Undercoat Foil C1 having undercoat layers formed on both sides of aluminum foil.

[Chemical Formula 6]

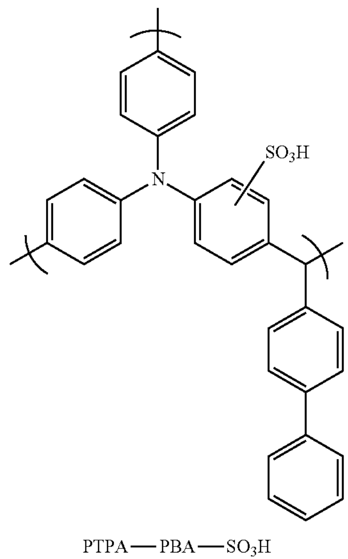

PTPA—PBA—$SO_3H$

Working Example 1-1

Undercoat Slurry A1 prepared in Comparative Example 1-1 was diluted 2-fold with 2-propanol, giving Undercoat Slurry A2.

Aside from using the resulting Undercoat Slurry A2, Undercoat Foils B2 and C2 were produced in the same way as in Comparative Example 1-1. The coating weight of the undercoat layer on Undercoat Foil B2 was calculated and found to be 0.088 g/m$^2$.

Working Example 1-2

Undercoat Slurry A1 prepared in Comparative Example 1-1 was diluted 4-fold with 2-propanol, giving Undercoat Slurry A3.

Aside from using the resulting Undercoat Slurry A3, Undercoat Foils B3 and C3 were produced in the same way as in Comparative Example 1-1. The coating weight of the undercoat layer on Undercoat Foil B3 was calculated and found to be 0.042 g/m$^2$.

Working Example 1-3

Undercoat Slurry A1 prepared in Comparative Example 1-1 was diluted 6-fold with 2-propanol, giving Undercoat Slurry A4.

Aside from using the resulting Undercoat Slurry A4, Undercoat Foils B4 and C4 were produced in the same way as in Comparative Example 1-1. The coating weight of the undercoat layer on Undercoat Foil B4 was calculated and found to be 0.032 g/m$^2$.

Comparative Example 1-2

First, 2.0 g of the oxazoline polymer-containing aqueous solution Epocros WS-700 (Nippon Shokubai Co., Ltd.; solids concentration, 25 wt %; weight-average molecular weight, $4\times10^4$; oxazoline group content, 4.5 mmol/g) as the dispersant was mixed together with 17.5 g of distilled water, and 0.5 g of MWCNTs was mixed therein. The resulting mixture was ultrasonically treated for 30 minutes at room temperature using a probe-type ultrasonicator, thereby giving a black MWCNT-containing dispersion in which MWCNTs were uniformly dispersed and which was free of precipitate.

Next, 0.7 g of the ammonium polyacrylate (PAA-$NH_4$)-containing aqueous solution Aron A-30 (solids concentration, 31.6 wt %; from Toagosei Co., Ltd.), 0.2 g of sodium alginate (Na alginate, from Kanto Chemical Co., Ltd.; extra pure reagent) and 49.1 g of distilled water were added to 50 g of the resulting MWCNT-containing dispersion and stirring was carried out, giving Undercoat Slurry A5.

The resulting Undercoat Slurry A5 was uniformly spread with a wire bar coater (OSP 13, wet film thickness, 13 μm) onto aluminum foil (thickness, 20 μm) as the current-collecting substrate and subsequently dried for 20 minutes at 120° C. to form an undercoat layer, thereby producing Undercoat Foil B5. Twenty pieces of the undercoat foil cut to dimensions of 5×10 cm were prepared and their weights were measured, following which the weight of the metal foil after rubbing off the undercoat layer using paper permeated with water was measured. The coating weight of the undercoat layer, as calculated from the weight difference in the undercoat foil before and after rubbing off the undercoat layer, was 0.113 g/m$^2$.

In addition, Undercoat Slurry A5 was similarly coated as well onto the opposite side of Undercoat Foil B5 and dried, thereby producing Undercoat Foil C5 having undercoat layers formed on both sides of aluminum foil.

Working Example 1-4

Aside from using a different wire bar coater (OSP 4, wet film thickness, 4 μm), Undercoat Foils B6 and C6 were produced in the same way as in Comparative Example 1-2. The coating weight of the undercoat layer on Undercoat Foil B6 was calculated and found to be 0.035 g/m$^2$.

Working Example 1-5

Aside from using a different wire bar coater (OSP 3, wet film thickness, 3 μm), Undercoat Foils B7 and C7 were produced in the same way as in Comparative Example 1-2. The coating weight of the undercoat layer on Undercoat Foil B7 was calculated and found to be 0.027 g/m$^2$.

Working Example 1-6

Aside from using a different wire bar coater (OSP 2, wet film thickness, 2 μm), Undercoat Foils B8 and C8 were produced in the same way as in Comparative Example 1-2. The coating weight of the undercoat layer on Undercoat Foil B8 was calculated and found to be 0.016 g/m$^2$.

Comparative Example 1-3

Aside from using acetylene black (AB, from Denka Co. Ltd.) instead of MWCNTs, Undercoat Slurry A9 and Undercoat Foils B9 and C9 were produced in the same way as in Comparative Example 1-1. The coating weight of the undercoat layer on Undercoat Foil B9 was calculated and found to be 0.166 g/m$^2$.

Comparative Example 1-4

Aside from using AB instead of MWCNTs, Undercoat Slurry A10 and Undercoat Foils B10 and C10 were produced in the same way as in Working Example 1-1. The coating weight of the undercoat layer on Undercoat Foil B10 was calculated and found to be 0.081 g/m$^2$.

Comparative Example 1-5

Aside from using AB instead of MWCNTs, Undercoat Slurry A11 and Undercoat Foils B11 and C11 were produced in the same way as in Working Example 1-2. The coating weight of the undercoat layer on Undercoat Foil B11 was calculated and found to be 0.036 g/m$^2$.

Comparative Example 1-6

Aside from using AB instead of MWCNTs, Undercoat Slurry A12 and Undercoat Foils B12 and C12 were produced in the same way as in Working Example 1-3. The coating weight of the undercoat layer on Undercoat Foil B12 was calculated and found to be 0.026 g/m$^2$.

Comparative Example 1-7

Aside from using AB instead of MWCNTs, Undercoat Foils B13 and C13 were produced in the same way as in Comparative Example 1-2. The coating weight of the undercoat layer on Undercoat Foil B13 was calculated and found to be 0.146 g/m$^2$.

Comparative Example 1-8

Aside from using AB instead of MWCNTs, Undercoat Foils B14 and C14 were produced in the same way as in Working Example 1-4. The coating weight of the undercoat layer on Undercoat Foil B14 was calculated and found to be 0.052 g/m$^2$.

Comparative Example 1-9

Aside from using AB instead of MWCNTs, Undercoat Foils B15 and C15 were produced in the same way as in Working Example 1-5. The coating weight of the undercoat layer on Undercoat Foil B15 was calculated and found to be 0.044 g/m$^2$.

Comparative Example 1-10

Aside from using AB instead of MWCNTs, Undercoat Foils B16 and C16 were produced in the same way as in Working Example 1-6. The coating weight of the undercoat layer on Undercoat Foil B16 was calculated and found to be 0.029 g/m$^2$.

[Ultrasonic Welding Test]

Ultrasonic welding tests were carried out by the following method on each of the undercoat foils produced in Working Examples 1-1 to 1-6 and Comparative Examples 1-1 to 1-10.

Using an ultrasonic welder from Emerson Japan, Ltd. (2000Xea, 40:0.8/40MA-XaeStand), five pieces of undercoat foil having undercoat layers formed on both sides were stacked on top of an aluminum tab (Hohsen Corporation; thickness, 0.1 mm; width, 5 mm) on an anvil, a horn was brought down onto the foil from above, and welding was carried out by applying ultrasonic vibrations. The welding surface area was set to 3×12 mm. Cases in which, after welding, the undercoat foil in contact with the horn does not tear, but the foil does tear when one tries to separate the tab and the undercoat foil were rated as "Pass"; cases in which, after welding, the tab and the foil separate were rated as "Fail". The results are shown in Table 1.

TABLE 1

| | Undercoat foil | Carbon material | Dispersant, etc. | Coating weight (g/m$^2$) | Weldability (pass/fail) |
|---|---|---|---|---|---|
| Comparative Example 1-1 | C1 | MWCNT | PTPA-S, PAA | 0.167 | Fail |
| Working Example 1-1 | C2 | MWCNT | PTPA-S, PAA | 0.088 | Pass |
| Working Example 1-2 | C3 | MWCNT | PTPA-S, PAA | 0.042 | Pass |
| Working Example 1-3 | C4 | MWCNT | PTPA-S, PAA | 0.032 | Pass |
| Comparative Example 1-2 | C5 | MWCNT | WS-700, $PAANH_4$, Na alginate | 0.113 | Fail |
| Working Example 1-4 | C6 | MWCNT | WS-700, $PAANH_4$, Na alginate | 0.035 | Pass |
| Working Example 1-5 | C7 | MWCNT | WS-700, $PAANH_4$, Na alginate | 0.027 | Pass |
| Working Example 1-6 | C8 | MWCNT | WS-700, $PAANH_4$, Na alginate | 0.016 | Pass |
| Comparative Example 1-3 | C9 | AB | PTPA-S, PAA | 0.166 | Fail |
| Comparative Example 1-4 | C10 | AB | PTPA-S, PAA | 0.081 | Pass |
| Comparative Example 1-5 | C11 | AB | PTPA-S, PAA | 0.036 | Pass |
| Comparative Example 1-6 | C12 | AB | PTPA-S, PAA | 0.026 | Pass |
| Comparative Example 1-7 | C13 | AB | WS-700, $PAANH_4$, Na alginate | 0.146 | Fail |
| Comparative Example 1-8 | C14 | AB | WS-700, $PAANH_4$, Na alginate | 0.052 | Pass |
| Comparative Example 1-9 | C15 | AB | WS-700, $PAANH_4$, Na alginate | 0.044 | Pass |
| Comparative Example 1-10 | C16 | AB | WS-700, $PAANH_4$, Na alginate | 0.029 | Pass |

As shown in Table 1, in cases where the coating weight exceeded 0.1 g/$m^2$, the welding strength between the tab and the undercoat foil was inadequate and separation between the tab and the undercoat foil arose. In cases where the coating weight was 0.1 g/$m^2$ or less, the welding strength between the tab and the undercoat foil was adequate; when an attempt was made to separate the tab and the undercoat foil, the undercoat foil tore. It is apparent from these results that, in order to weld the undercoat foil and the metal tab to a sufficient strength, the coating weight of the undercoat layer must be set to not more than 0.1 g/$m^2$.

Comparative Example 1-11

Aside from using copper foil (thickness, 15 μm) instead of aluminum foil, Undercoat Foil C16 was produced in the same way as in Comparative Example 1-1.

Working Example 1-7

Aside from using copper foil (thickness, 15 μm) instead of aluminum foil, Undercoat Foil C17 was produced in the same way as in Working Example 1-1.

Working Example 1-8

Aside from using copper foil (thickness, 15 μm) instead of aluminum foil, Undercoat Foil C18 was produced in the same way as in Working Example 1-2.

Working Example 1-9

Aside from using copper foil (thickness, 15 μm) instead of aluminum foil, Undercoat Foil C19 was produced in the same way as in Working Example 1-3.

[Ultrasonic Welding Test]

Apart from using nickel-plated copper tabs (Hohsen Corporation; thickness, 0.1 mm; width, 5 mm), ultrasonic welding tests were carried out by the same method as described above on the undercoat foils produced in Working Example 1-7 to 1-9 and Comparative Example 1-11. Cases in which, after welding, the undercoat foil in contact with the horn does not tear, but the foil does tear when one tries to separate the tab and the undercoat foil were rated as “Pass”; cases in which, after welding, the tab and the foil separate were rated as “Fail”. The results are shown in Table 2.

TABLE 2

| | Undercoat foil | Carbon material | Dispersant, etc. | Coating weight (g/$m^2$) | Weldability (pass/fail) |
|---|---|---|---|---|---|
| Comparative Example 1-11 | C16 | MWCNT | PTPA-S, PAA | 0.167 | Fail |
| Working Example 1-7 | C17 | MWCNT | PTPA-S, PAA | 0.088 | Pass |
| Working Example 1-8 | C18 | MWCNT | PTPA-S, PAA | 0.042 | Pass |
| Working Example 1-9 | C19 | MWCNT | PTPA-S, PAA | 0.032 | Pass |

As shown in Table 2, in cases where copper foil was used as the current-collecting substrate, in order to weld the undercoat foil and the metal tab to a sufficient strength, it was necessary for the coating weight of the undercoat layer to be set to not more than 0.1 g/$m^2$.

[2] Production of Lithium-Ion Secondary Battery Using Lithium Manganate as Positive Electrode Comparative Example 2-1

The following were mixed together in a homogenizing disperser at 3,500 rpm for 1 minute: 26.1 g of lithium manganate (LMO, from Toyoshima Manufacturing Co., Ltd.) as the active material, 19.3 g of an NMP solution of polyvinylidene fluoride (PVdF) (12 wt %; KF Polymer L#1120, from Kureha Corporation) as the binder, 0.58 g of AB as a conductive additive and 3.99 g of N-methylpyrrolidone (NMP). Next, using a thin-film spin-type high-speed mixer, mixing treatment was carried out for 60 seconds at a peripheral speed of 20 m/s, in addition to which deaeration was carried out for 2 minutes at 1,000 rpm in a planetary centrifugal mixer, thereby producing an electrode slurry (solids concentration, 58 wt %; LMO:PVdF:AB=90:8:2 (weight ratio).

The resulting electrode slurry was spread uniformly (wet film thickness, 100 μm) over the entire surface of the undercoat layer on Undercoat Foil B1 that had an undercoat layer coated on one side and was produced in Comparative Example 1-1, following which the slurry was dried at 80° C. for 30 minutes and then at 120° C. for 30 minutes, thereby forming an active material layer on the undercoat layer. This layer was then pressed with a roll press, producing Electrode D1 having an active material layer thickness of 30 m.

The resulting Electrode D1 was die-cut in the shape of a 10 mm diameter disk and the weight was measured, following which the electrode disk was vacuum dried at 100° C. for 15 hours and then transferred to a glovebox filled with argon.

A stack of six pieces of lithium foil (Honjo Chemical Corporation; thickness, 0.17 mm) that had been die-cut to a diameter of 14 mm was set on a 2032 coin cell (Hohsen Corporation) cap to which a washer and a spacer had been welded, and one piece of separator (Celgard 2400) die-cut to a diameter of 16 mm that had been permeated for at least 24 hours with an electrolyte solution (Kishida Chemical Co., Ltd.; ethylene carbonate:diethyl carbonate=1:1 (volume ratio) solution containing 1 mol/L of lithium hexafluorophosphate as the electrolyte) was laid on the foil. The Electrode D1 was then placed on top thereof with the active material-coated side facing down. Next, one drop of electrolyte solution was deposited thereon, after which the coin cell case and gasket were placed on top and sealing was carried out with a coin cell crimper. The cell was then left at rest for 24 hours, giving a secondary battery for testing.

Working Example 2-1

Aside from using Undercoat Foil B2 produced in Working Example 1-1, Electrode D2 and a secondary battery for testing were produced in the same way as in Comparative Example 2-1.

Working Example 2-2

Aside from using Undercoat Foil B3 produced in Working Example 1-2, Electrode D3 and a secondary battery for testing were produced in the same way as in Comparative Example 2-1.

Working Example 2-3

Aside from using Undercoat Foil B4 produced in Working Example 1-3, Electrode D4 and a secondary battery for testing were produced in the same way as in Comparative Example 2-1.

Comparative Example 2-2

Aside from using Undercoat Foil B5 produced in Comparative Example 1-2, Electrode D5 and a secondary battery for testing were produced in the same way as in Comparative Example 2-1.

Working Example 2-4

Aside from using Undercoat Foil B6 produced in Working Example 1-4, Electrode D6 and a secondary battery for testing were produced in the same way as in Comparative Example 2-1.

Working Example 2-5

Aside from using Undercoat Foil B7 produced in Working Example 1-5, Electrode D7 and a secondary battery for testing were produced in the same way as in Comparative Example 2-1.

Working Example 2-6

Aside from using Undercoat Foil B8 produced in Working Example 1-6, Electrode D8 and a secondary battery for testing were produced in the same way as in Comparative Example 2-1.

Comparative Example 2-3

Aside from using Undercoat Foil B9 produced in Comparative Example 1-3, Electrode D9 and a secondary battery for testing were produced in the same way as in Comparative Example 2-1.

Comparative Example 2-4

Aside from using Undercoat Foil B10 produced in Comparative Example 1-4, Electrode D10 and a secondary battery for testing were produced in the same way as in Comparative Example 2-1.

Comparative Example 2-5

Aside from using Undercoat Foil B11 produced in Comparative Example 1-5, Electrode D11 and a secondary battery for testing were produced in the same way as in Comparative Example 2-1.

Comparative Example 2-6

Aside from using Undercoat Foil B12 produced in Comparative Example 1-6, Electrode D12 and a secondary battery for testing were produced in the same way as in Comparative Example 2-1.

Comparative Example 2-7

Aside from using Undercoat Foil B13 produced in Comparative Example 1-7, Electrode D13 and a secondary battery for testing were produced in the same way as in Comparative Example 2-1.

Comparative Example 2-8

Aside from using Undercoat Foil B14 produced in Comparative Example 1-8, Electrode D14 and a secondary battery for testing were produced in the same way as in Comparative Example 2-1.

Comparative Example 2-9

Aside from using Undercoat Foil B15 produced in Comparative Example 1-9, Electrode D15 and a secondary battery for testing were produced in the same way as in Comparative Example 2-1.

Comparative Example 2-10

Aside from using Undercoat Foil B16 produced in Comparative Example 1-10, Electrode D16 and a secondary battery for testing were produced in the same way as in Comparative Example 2-1.

Comparative Example 2-11

Aside from using pure aluminum foil, Electrode D17 and a secondary battery for testing were produced in the same way as in Comparative Example 2-1.

The physical properties of the electrodes as positive electrodes were evaluated under the following conditions for the lithium-ion secondary batteries produced in above Working Examples 2-1 to 2-6 and Comparative Examples 2-1 to 2-11. Table 2 shows the average voltage during 3 C discharge.

Current: Constant-current charging at 0.5 C, and constant-current discharging at 0.5 C, 3 C, 5 C and 10 C (the capacity of LMO was set to 148 mAh/g and the discharge rate was raised every 5 cycles, after which the discharge rate at the end was returned to 0.5 C)

Cut-off voltage: 4.50 V-3.00 V

Temperature: room temperature

TABLE 3

| | Undercoat foil | Carbon material | Dispersant, etc. | Coating weight ($g/m^2$) | Average voltage (V) during 3 C discharge |
|---|---|---|---|---|---|
| Comparative Example 2-1 | B1 | MWCNT | PTPA-S, PAA | 0.167 | 3.88 |
| Working Example 2-1 | B2 | MWCNT | PTPA-S, PAA | 0.088 | 3.88 |
| Working Example 2-2 | B3 | MWCNT | PTPA-S, PAA | 0.042 | 3.89 |
| Working Example 2-3 | B4 | MWCNT | PTPA-S, PAA | 0.032 | 3.88 |
| Comparative Example 2-2 | B5 | MWCNT | WS-700, $PAANH_4$, Na alginate | 0.113 | 3.89 |
| Working Example 2-4 | B6 | MWCNT | WS-700, $PAANH_4$, Na alginate | 0.035 | 3.88 |
| Working Example 2-5 | B7 | MWCNT | WS-700, $PAANH_4$, Na alginate | 0.027 | 3.88 |

TABLE 3-continued

| | Undercoat foil | Carbon material | Dispersant, etc. | Coating weight (g/m²) | Average voltage (V) during 3 C discharge |
|---|---|---|---|---|---|
| Working Example 2-6 | B8 | MWCNT | WS-700, $PAANH_4$, Na alginate | 0.016 | 3.87 |
| Comparative Example 2-3 | B9 | AB | PTPA-S, PAA | 0.166 | 3.70 |
| Comparative Example 2-4 | B10 | AB | PTPA-S, PAA | 0.081 | 3.77 |
| Comparative Example 2-5 | B11 | AB | PTPA-S, PAA | 0.036 | 3.48 |
| Comparative Example 2-6 | B12 | AB | PTPA-S, PAA | 0.026 | 3.38 |
| Comparative Example 2-7 | B13 | AB | WS-700, $PAANH_4$, Na alginate | 0.146 | 3.85 |
| Comparative Example 2-8 | B14 | AB | WS-700, $PAANH_4$, Na alginate | 0.052 | 3.43 |
| Comparative Example 2-9 | B15 | AB | WS-700, $PAANH_4$, Na alginate | 0.044 | 3.27 |
| Comparative Example 2-10 | B16 | AB | WS-700, $PAANH_4$, Na alginate | 0.029 | 3.38 |
| Comparative Example 2-11 | — | — | — | — | 3.44 |

From these results, it is apparent that, in secondary batteries having an undercoat foil which is ultrasonically weldable and has a coating weight of 0.1 g/m$^2$ or less, when AB was used as the carbon material, the average voltage decreased rapidly, the voltage sometimes being lower than in secondary batteries where pure aluminum foil was used. By contrast, when MWCNTs were used as the carbon material, the average voltage was high and a sufficiently low resistance was achieved.

[3] Production of Laminate Cell Using Lithium Manganate as Positive Electrode

Working Example 3-1

The following were mixed together in a homogenizing disperser at 3,500 rpm for 1 minute: 26.1 g of lithium manganate (LMO, from Toyoshima Manufacturing Co., Ltd.) as the active material, 19.3 g of an NMP solution of polyvinylidene fluoride (PVdF) (12 wt %; KF Polymer L#1120, from Kureha Corporation) as the binder, 0.58 g of AB as a conductive additive, and 3.99 g of N-methylpyrrolidone (NMP). Next, using a thin-film spin-type high-speed mixer, mixing treatment was carried out for 60 seconds at a peripheral speed of 20 m/s, in addition to which deaeration was carried out for 2 minutes at 1,000 rpm in a planetary centrifugal mixer, thereby producing an electrode slurry (solids concentration, 58 wt %; LMO:PVdF:AB=90:8:2 (weight ratio).

The Undercoat Foil B3 coated on one side with an undercoat layer that was produced in Working Example 1-2 was cut out into a rectangular shape measuring 8 cm on the short sides and 20 cm on the long sides. The electrode slurry obtained as described above was spread uniformly thereon in a 20 cm band having a width of 5 cm at the center, leaving 1.5 cm free of slurry at both edges on the short sides, following which the slurry was dried at 80° C. for 30 minutes and then at 120° C. for 30 minutes, thereby forming an active material layer on the undercoat layer. This layer was then rolled with a roll press, producing an electrode sheet having an active material layer thickness of 30 μm. The coating weight of the active material, which was determined by die-cutting the electrode sheet in the form of a disk having a diameter of 10 mm and measuring the weight, was 7.58 mg/cm$^2$.

The resulting electrode sheet was die-cut to dimensions of 4 cm×5 cm for a region coated with the active material layer and dimensions of 1.5 cm×1 cm for a region not coated with the active material layer on the long side, thereby giving positive electrode E1. An aluminum tab (4 mm wide×6.5 cm; thickness 0.1 mm; Hohsen Corporation) was welded with an ultrasonic welder to the region where the undercoat layer was formed and the active material layer was not formed.

The following were mixed together in a homogenizing disperser at 3,500 rpm for 1 minute: 11.3 g of graphite (abbreviated below as "Gr"; CGB-15 from Nippon Graphite Industries, Ltd.) as the active material, 3.22 g of an aqueous dispersion of a polyacrylonitrile binder (14.9 wt %; LA-132, from Chengdu Indigo Power Sources Co., Ltd.) as the binder, 0.24 g of AB as a conductive additive, and 15.3 g of water. Next, using a thin-film spin-type high-speed mixer, mixing treatment was carried out for 60 seconds at a peripheral speed of 20 m/s, in addition to which deaeration was carried out for 2 minutes at 1,000 rpm in a planetary centrifugal mixer, thereby producing an electrode slurry (solids concentration, 40 wt %; Gr:LA-132:AB=94:4:2 (weight ratio).

Pure aluminum foil (thickness, 18 μm) was cut out into a rectangular shape measuring 8 cm on the short sides and 20 cm on the long sides. The electrode slurry obtained as described above was spread uniformly thereon in a 20 cm band having a width of 5 cm at the center, leaving 1.5 cm free of slurry at both edges on the short sides, following which the slurry was dried at 80° C. for 30 minutes and then at 120° C. for 30 minutes, thereby forming an active material layer on the undercoat layer. This layer was then pressed with a roll press, producing an electrode sheet having an active material layer thickness of 20 μm. The coating weight of the active material, which was determined by die-cutting the electrode sheet in the form of a disk having a diameter of 10 mm and measuring the weight, was 3.54 mg/cm$^2$.

The resulting electrode sheet was die-cut to dimensions of 4.4 cm×5.4 cm for a region coated with the active material layer and dimensions of 1.5 cm×1 cm for a region not coated with the active material layer on the long side, thereby giving negative electrode F1. A nickel-coated copper tab (4 mm wide×6.5 cm; thickness 0.1 mm; Hohsen Corporation) was welded with an ultrasonic welder to the region where the active material layer was not formed.

The positive electrode E1 was enclosed by a separator (Celgard 2400) in such a way as to cover the coated side of the electrode, following which the positive electrode E1 and the negative electrode F1 were stacked with the electrode coated sides facing one another, and the tabs were attached to a laminate film (Dai Nippon Printing Co., Ltd.) by heat and pressure bonding. After 9 hours of drying at 100° C. in vacuo, the electrode assembly was transferred to a glovebox filled with argon. Next, 0.5 mL of an electrolyte solution (Kishida Chemical Co., Ltd.; ethylene carbonate:diethyl carbonate=1:1 (volume ratio) solution containing 1 mol/L of lithium hexafluorophosphate as the electrolyte) was injected and allowed to penetrate under reduced pressure of 0.5 atmosphere for 20 minutes, following which free areas of the laminate film were sealed by heat and pressure bonding in a vacuum, thereby producing a laminate cell for testing.

Comparative Example 3-1

Aside from using pure aluminum foil, a positive electrode E2, a negative electrode F2 and a laminate cell for testing were produced in the same way as in Working Example 3-1. The coating weights of the positive electrode and the negative electrode were respectively 7.35 $mg/cm^2$ and 3.49 $mg/cm^2$.

The laminate cells produced in Working Example 3-1 and Comparative Example 3-1 were evaluated under the following conditions. Table 4 shows the average voltages and discharge capacities during 1 C discharge.

Current: Constant-current charging and discharging at 0.1 C for 2 cycles, followed by constant-current charging at 0.5 C and constant-current discharging at 0.5 C, 3 C, 5 C and 10 C (the capacity of LMO was set to 148 mAh/g and the discharge rate was raised every 3 cycles)

Cut-off voltage: 4.50 V-3.00 V

Temperature: room temperature

TABLE 4

| | Undercoat foil | Carbon material | Dispersant, etc. | Coating weight ($g/m^2$) | Average voltage during 1 C discharge (V) | Capacity during 1 C discharge (mAh/g) | Capacity during 3 C discharge (mAh/g) |
|---|---|---|---|---|---|---|---|
| Working Example 3-1 | B3 | MWCNT | PTPA-S, PAA | 0.042 | 3.80 | 78.3 | 67.9 |
| Comparative Example 3-1 | — | — | — | — | 3.00 | 0.9 | could not discharge |

As demonstrated in Working Example 3-1, a laminate cell can be produced by welding an aluminum tab to, on an undercoat foil that has a coating weight of 0.1 $g/m^2$ or less and is ultrasonically weldable, a region of the foil where the undercoat layer has been formed and the active material layer has not been formed, without the need for such steps as peeling away the undercoat layer or forming a region that is not coated with the undercoat layer. Moreover, as is apparent from Table 3, in 1 C discharge, when a pure aluminum foil is used, the voltage is low and discharge is substantially impossible, whereas when an undercoat foil is used, discharge is possible because the battery has a low resistance.

The invention claimed is:

1. An undercoat foil for an energy storage device electrode, comprising a current-collecting substrate and an undercoat layer formed on at least one side of the current-collecting substrate, wherein the undercoat layer is formed from a composition comprising carbon nanotubes, a carbon nanotube dispersant and a crosslinking agent, and has a coating weight per side of the current-collecting substrate of at least 0.001 $g/m^2$ and less than 0.05 $g/m^2$; and the carbon nanotube dispersant is a pendant oxazoline group-containing vinyl polymer.

2. The undercoat foil for an energy storage device electrode of claim 1, wherein the undercoat layer is formed on at least one side of the current-collecting substrate in such a way as to cover the entire surface thereof.

3. The undercoat foil for an energy storage device electrode of claim 1 or 2, wherein the undercoat layer includes a matrix polymer.

4. The undercoat foil for an energy storage device electrode of claim 1, wherein the undercoat layer has a thickness of from 0.01 to 10 μm.

5. The undercoat foil for an energy storage device electrode of claim 1, wherein the current-collecting substrate is aluminum foil or copper foil.

6. An energy storage device electrode comprising the undercoat foil for an energy storage device electrode of claim 1 and an active material layer formed over part or all of a surface of the undercoat layer.

7. The energy storage device electrode of claim 6, wherein the active material layer is formed over part of the undercoat layer surface.

8. The energy storage device electrode of claim 7, wherein the active material layer is formed in such a way as to cover all regions of the undercoat layer other than a peripheral edge thereof.

9. An energy storage device comprising the energy storage device electrode of any one of claims 6 to 8.

10. An energy storage device comprising at least one electrode assembly comprised of one or a plurality of the electrodes of claim 7 or 8 and a metal tab, wherein at least one of the electrodes is ultrasonically welded to the metal tab at a region of the electrode where the undercoat layer is formed and the active material layer is not formed.

11. The energy storage device of claim 10, wherein the metal tab is made of at least one metal selected from the group consisting of aluminum, copper and nickel.

12. A method for manufacturing an energy storage device comprising one or a plurality of the electrodes of claim 7 or 8, which method comprises the step of ultrasonically welding at least one of the electrodes to the metal tab at a region of the electrode where the undercoat layer is formed and the active material layer is not formed.

13. The undercoat foil for an energy storage device electrode of claim 1, wherein the concentration of the carbon nanotube dispersant in the composition is 0.001 to about 30 wt %.

14. The undercoat foil for an energy storage device electrode of claim 1, wherein the amount of crosslinking agent is 0.001 to 80 wt % based on the dispersant.

15. The undercoat foil for an energy storage device electrode of claim 1, wherein the crosslinking agent is crosslinked with the dispersant in the undercoat layer.

* * * * *